(12) United States Patent
Hanazaki

(10) Patent No.: US 9,874,994 B2
(45) Date of Patent: Jan. 23, 2018

(54) DEVICE, METHOD AND PROGRAM FOR ICON AND/OR FOLDER MANAGEMENT

(71) Applicant: KYOCERA CORPORATION, Kyoto-shi, Kyoto (JP)

(72) Inventor: Mitsuo Hanazaki, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 457 days.

(21) Appl. No.: 13/849,044

(22) Filed: Mar. 22, 2013

(65) Prior Publication Data

US 2013/0254719 A1    Sep. 26, 2013

(30) Foreign Application Priority Data

Mar. 23, 2012 (JP) ................................ 2012-068163

(51) Int. Cl.
| | | |
|---|---|---|
| *G06F 3/048* | (2013.01) | |
| *G06F 3/0481* | (2013.01) | |
| *G06F 3/0486* | (2013.01) | |
| *G06F 3/0482* | (2013.01) | |
| *G06F 3/0484* | (2013.01) | |

(52) U.S. Cl.
CPC ........ *G06F 3/04817* (2013.01); *G06F 3/0486* (2013.01); *G06F 3/0482* (2013.01); *G06F 3/04842* (2013.01)

(58) Field of Classification Search
USPC ......................................................... 715/846
See application file for complete search history.

(56) References Cited

U.S. PATENT DOCUMENTS

| | | | |
|---|---|---|---|
| 2005/0225644 A1 | 10/2005 | Shibuya et al. | |
| 2005/0246331 A1* | 11/2005 | De Vorchik et al. | ............. 707/3 |
| 2005/0268521 A1* | 12/2005 | Cox | .......................... F41G 1/38 |
| | | | 42/130 |
| 2006/0136456 A1* | 6/2006 | Jacobs | ............. G06F 17/30061 |
| 2007/0080223 A1* | 4/2007 | Japuntich | ........... A61B 19/0288 |
| | | | 235/439 |
| 2008/0040668 A1* | 2/2008 | Ala-Rantala | .......... G06F 3/0482 |
| | | | 715/713 |
| 2008/0165160 A1 | 7/2008 | Kocienda et al. | |
| 2009/0222766 A1* | 9/2009 | Chae | ................... G06F 3/04817 |
| | | | 715/702 |
| 2009/0254623 A1* | 10/2009 | Hones et al. | ................. 709/206 |
| 2011/0197550 A1* | 8/2011 | Carlson | ................ B31D 5/0047 |
| | | | 53/472 |

(Continued)

FOREIGN PATENT DOCUMENTS

| | | |
|---|---|---|
| JP | 7-36749 A | 2/1995 |
| JP | 2005-303453 A | 10/2005 |
| WO | 2008086302 A1 | 7/2008 |

OTHER PUBLICATIONS

Lex Friedman, "Apple iOS 4: Folders aint so good", Jun. 23, 2010, Macworld.com, pp. 1-4.*

(Continued)

*Primary Examiner* — Tam Tran
(74) *Attorney, Agent, or Firm* — Hauptman Ham, LLP

(57) ABSTRACT

According to an aspect, a device includes a touch screen display and a controller. The touch screen display displays a folder for containing therein an icon corresponding to an application. The controller changes a display mode of the folder according to the number of icons contained in the folder.

15 Claims, 11 Drawing Sheets

(56) References Cited

U.S. PATENT DOCUMENTS

2011/0252373 A1* 10/2011 Chaudhri ............... 715/835
2012/0030628 A1   2/2012 Lee et al.
2012/0084695 A1*  4/2012 Higgins ............... G06F 8/33
                                                    715/771

OTHER PUBLICATIONS

Authors et al., Method to automatically adjust views within a folder based on number of objects under representation, Mar. 30, 2002, IP.com, pp. 1-3.*

Authors et all, Method and System for Visual Folder Explorer, Sep. 24, 2014, IP.com, pp. 1-3.*

Office Action dated Jun. 23, 2015, corresponding to Japanese patent application No. 2012-068163, for which an explanation of relevance is attached.

* cited by examiner

DEVICE, METHOD AND PROGRAM FOR ICON AND/OR FOLDER MANAGEMENT

CROSS-REFERENCE TO RELATED APPLICATIONS

This application claims priority from Japanese Application No. 2012-068163, filed on Mar. 23, 2012, the content of which is incorporated by reference herein in its entirety.

BACKGROUND

1. Technical Field

The present application relates to a device, a method, and a storage medium storing therein a program. More particularly, the present application relates to a device including a touch screen, a method of controlling the device, and a storage medium storing therein a program for controlling the device.

2. Description of the Related Art

A touch screen device having a touch screen has been known. Examples of the touch screen devices include, but are not limited to, a smartphone and a tablet. The touch screen device detects a gesture of a finger, a pen, or a stylus pen through the touch screen. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Most of the touch screen devices display a screen called a home screen on a display. Objects called icons are disposed on the home screen. When detecting a gesture performed for an icon, the touch screen device executes an application corresponding to the icon for which the gesture is performed.

As the number of applications installed in the touch screen device increases, the number of icons disposed on the home screen increases, thus consuming a space of the home screen that is reserved for disposing icons. Therefore, there is a method of securing a space on the home screen by managing the icons disposed on the home screen in such a manner that the icons are contained in a folder in a certain unit. However, it is difficult for the user to know the number of icons contained in the folder. For example, when the number of icons containable in a folder is limited, the user, who fails to know the number of icons contained in the folder, is inconvenienced because the user cannot know whether an icon is containable in the folder.

For the foregoing reasons, there is a need for a device, a method, and a program that can comprehensibly display the status of a folder containing icons to a user.

SUMMARY

According to an aspect, a device includes a touch screen display and a controller. The touch screen display displays a folder for containing therein an icon corresponding to an application. The controller changes a display mode of the folder according to the number of icons contained in the folder.

According to another aspect, a method is for controlling a device including a touch screen display. The method includes: displaying a folder on the touch screen display, the folder being configured to contain therein an icon corresponding to an application; and changing a display mode of the folder according to the number of icons contained in the folder.

According to another aspect, a non-transitory storage medium stores a control program. When executed by a device including a touch screen display, the program causes the device to execute: displaying a folder on the touch screen display, the folder being configured to contain therein an icon corresponding to an application; and changing a display mode of the folder according to the number of icons contained in the folder.

DETAILED DESCRIPTION

Exemplary embodiments of the present invention will be explained in detail below with reference to the accompanying drawings. A smartphone will be explained below as an example of a device provided with a touch screen.

Figure 1:
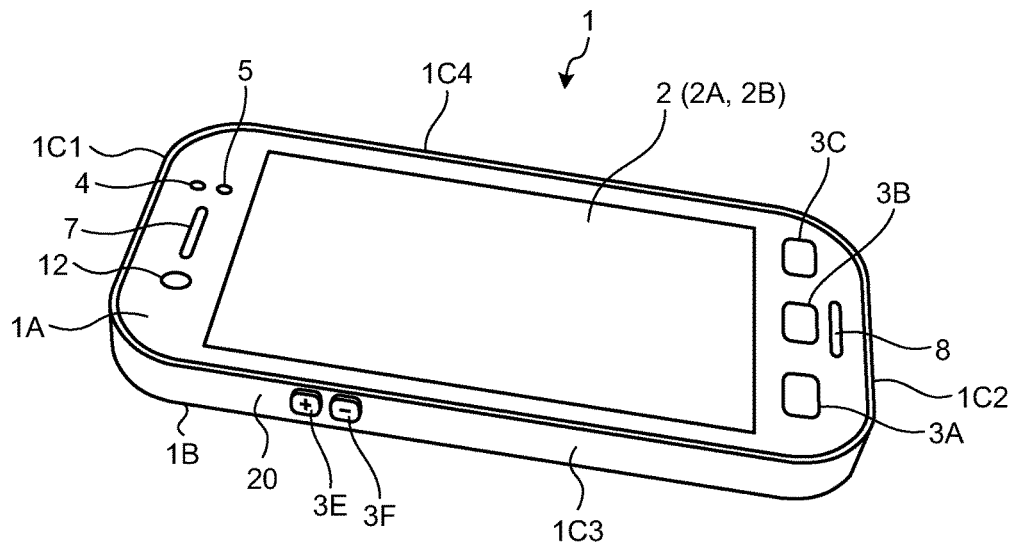
FIG. 1 is a perspective view of a smartphone according to an embodiment.
Figure 2:
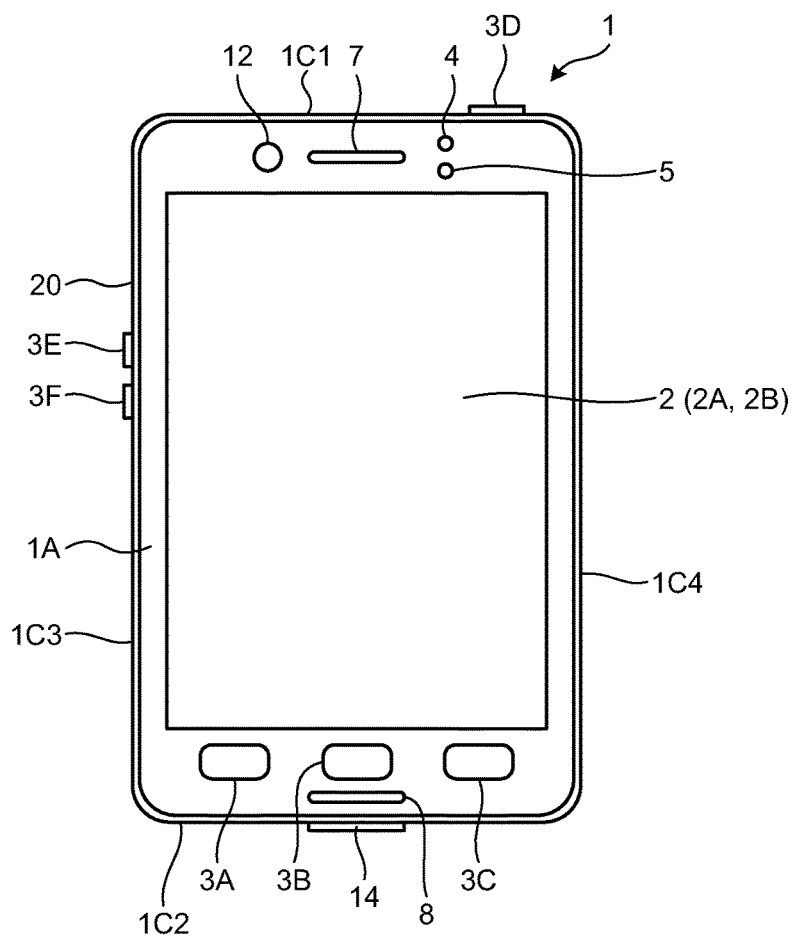
FIG. 2 is a front view of the smartphone.
Figure 3:
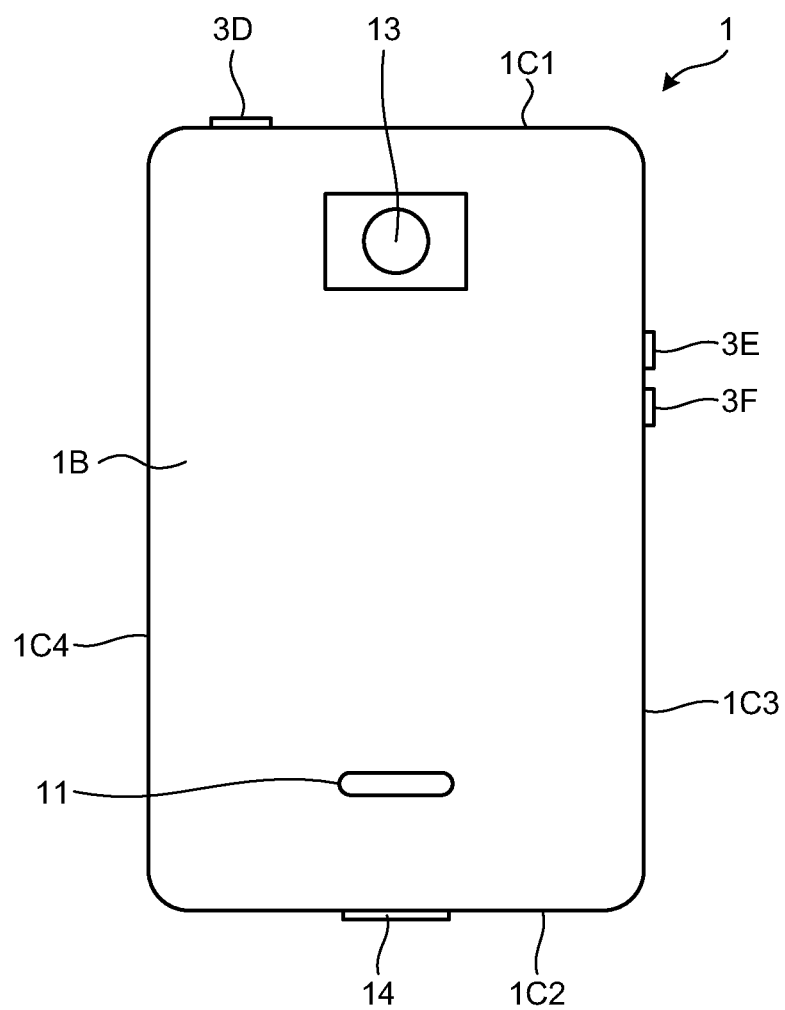
FIG. 3 is a rear view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a speaker 11 and a camera 13, which are provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (GELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B.

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X", "the controller detects X", "the touch screen detects X", or "the touch screen display detects X".

Figure 4:
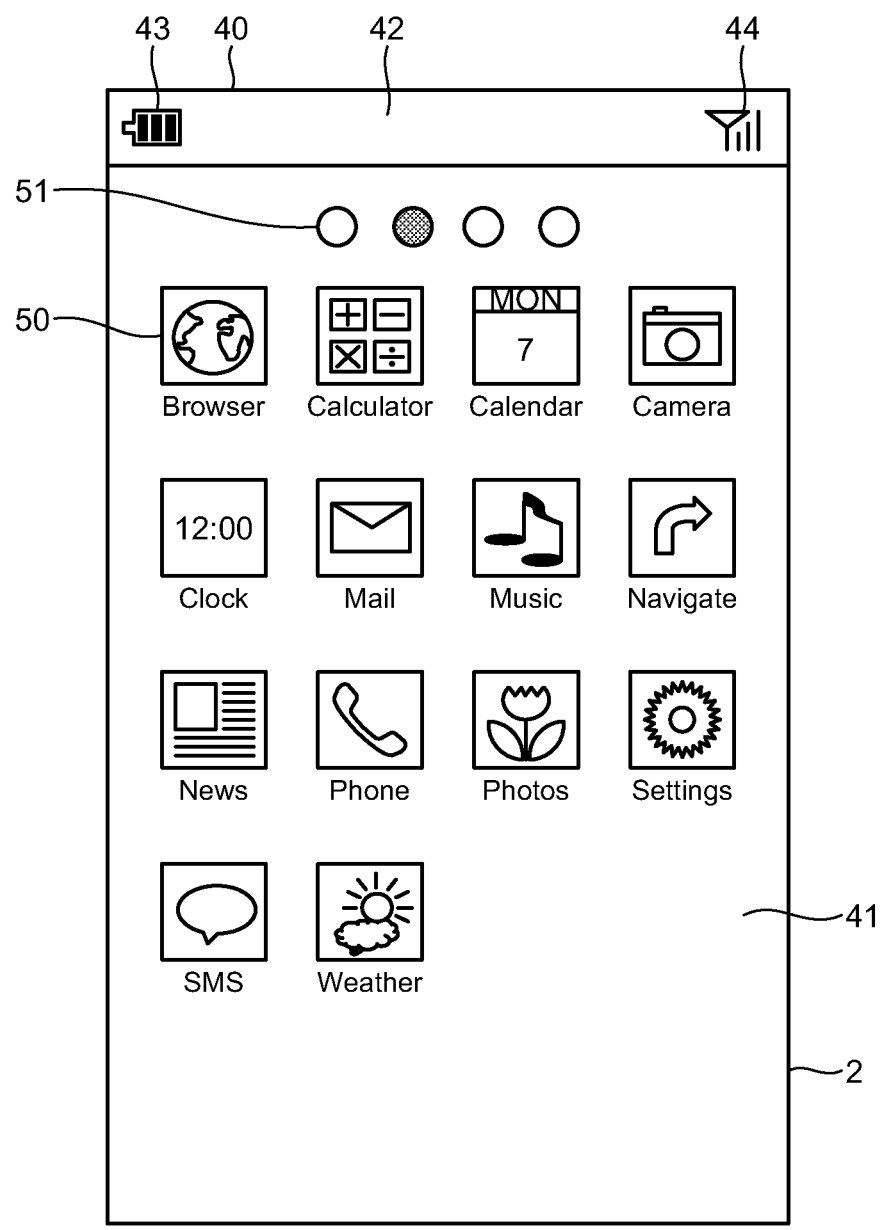
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application. Folders for containing the icons can also be on the home screen of the smartphone 1.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even if there is a plurality of home screens.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes four symbols. This means the number of home screens is four. According to the indicator 51 in the example illustrated in FIG. 4, the second symbol from the left is displayed in a different manner from that of the other symbols. This means that the second home screen from the left is currently displayed.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
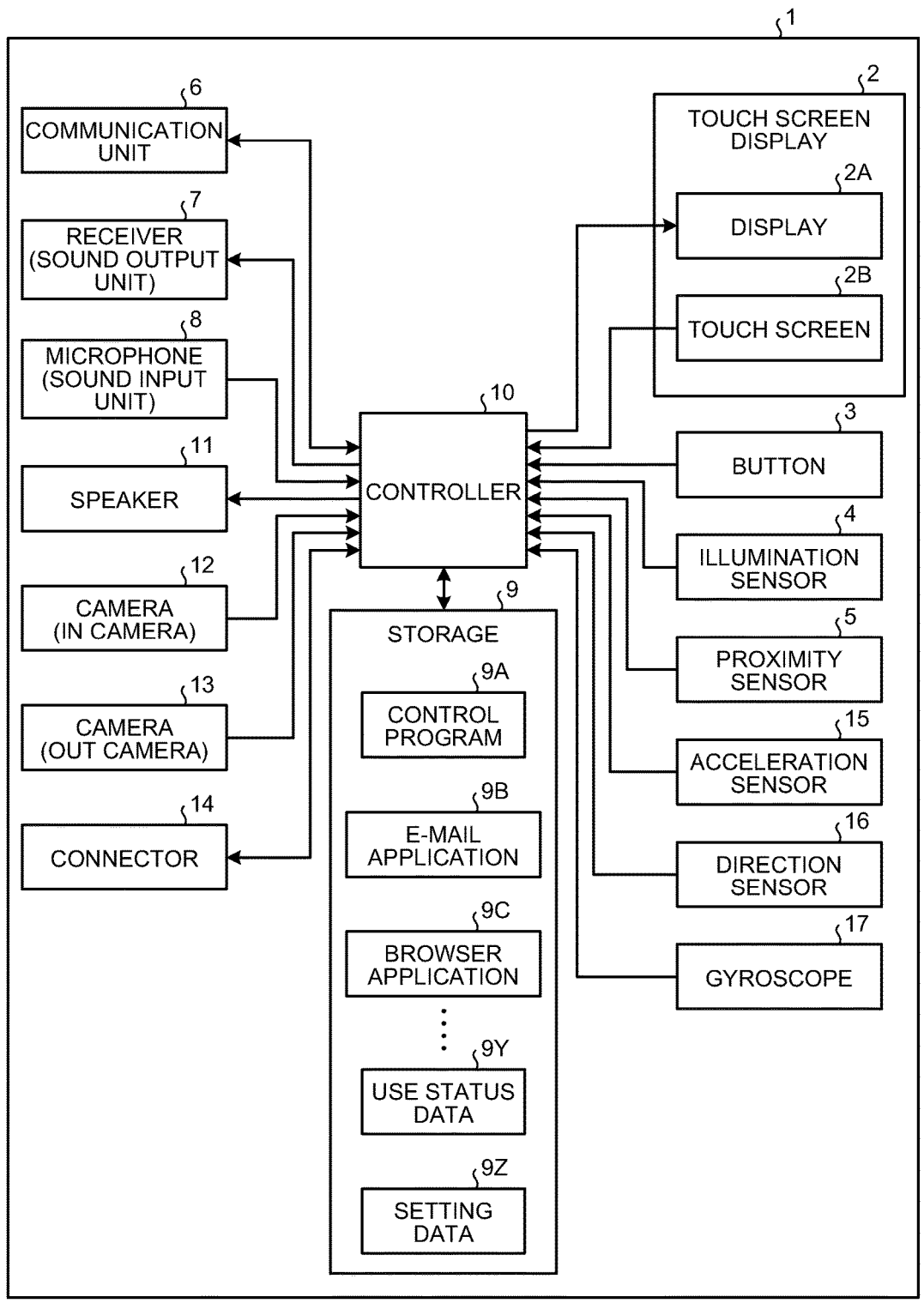
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the speaker 11, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multipush.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects the presence of the nearby object, for example, when the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 and the speaker 11 are sound output units. The receiver 7 and the speaker 11 output a sound signal transmitted from the controller 10 as sound. The receiver 7 is used, for example, to output voice of the other party on the phone. The speaker 11 is used, for example, to output a ring tone and music. Either one of the receiver 7 and the speaker 11 may double as the other function. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semi-conductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9 stores, for example, a control program 9A, an e-mail application 9B, a browser application 9C, use status data 9Y, and setting data 9Z. The e-mail application 9B provides an e-mail function. The e-mail function enables, for example, the composition, transmission, reception and display of an e-mail. The browser application 9C provides a WEB browsing function. The WEB browsing function enables, for example, the display of a WEB page and the editing of a bookmark. The use status data 9Y includes information about the use status of applications installed in the smartphone 1. For example, the use status data 9Y includes items such as Screen, Column, Row, Image, Name, Installation Date and Time, Use Count, and Final Use Date and time, and retains data with respect to each application installed in the smartphone 1. The setting data 9Z includes information about various settings related to operations of the smartphone 1.

The control program 9A provides functions related to various controls for operating the smartphone 1. The control program 9A implements a call, for example, by controlling the communication unit 6, the receiver 7, the microphone 8, and/or the like. The function provided by the control program 9A includes a function for changing a display mode of a folder according to the number of icons contained in the a folder. The function provided by the control program 9A is sometimes used in combination with the function provided by any other program such as the e-mail application 9B.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, the receiver 7, and the speaker 11. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to thereby change a display mode of a folder according to the number of icons contained in the folder.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

An example of control based on the function provided by the control program 9A will be described with reference to FIGS. 6 to 11. The function provided by the control program 9A includes a function for changing a display mode of a folder according to the number of icons contained in the folder. For example, based on the function provided by the control program 9A, the smartphone 1 changes a display mode of a folder to display the number of icons contained in the folder.

Figure 6:
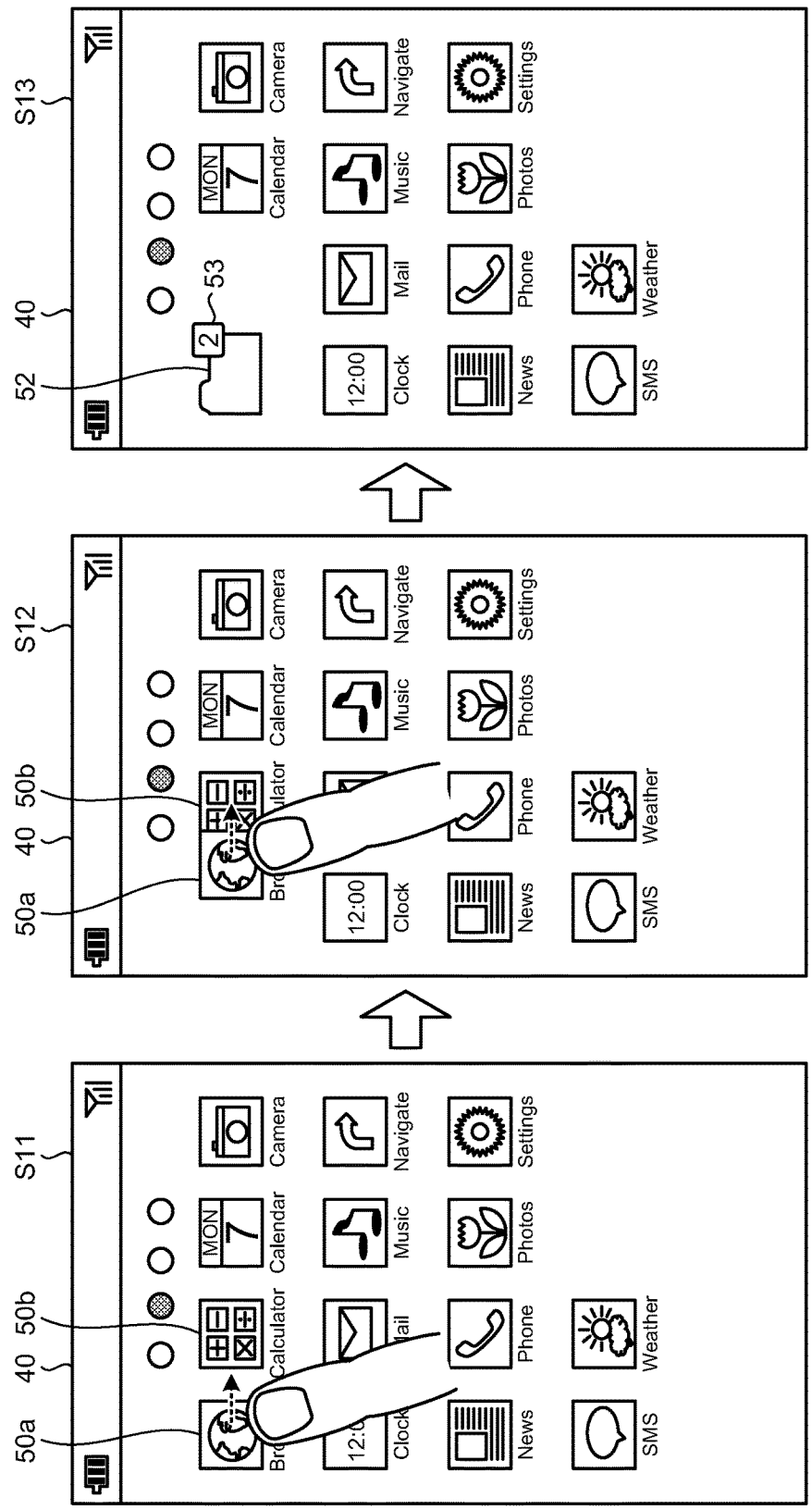
FIG. 6 is a diagram illustrating an example of control for displaying the number of icons contained in a folder.

FIG. 6 represents an example of control for generating a folder according to an operation of the user, containing icons in the generated folder, and displaying the number of icons contained in the folder.

As illustrated in Step S11, for example, when an icon 50a is long-touched with a finger of the user, the smartphone 1 detects the same as a movement start operation for the icon 50a. After detecting the movement start operation, the smartphone 1 moves the icon 50a according to a drag of the icon 50a. The smartphone 1 may detects various operations detectable through the touch screen 2B, such as a double tap on the icon 50a and a long touch for the home screen 40, as the movement start operation.

Subsequently, as illustrated in Step S12, when the icon 50a is dragged by a finger of the user and is superimposed on an icon 50b, the smartphone 1 generates a folder 52 for containing the icon 50a and the icon 50b.

Subsequently, as illustrated in Step S13, the smartphone 1 contains the icon 50a and the icon 50b in the generated folder 52 and disposes the folder 52, to which an image 53 corresponding to the number of contained icons is added, on the home screen 40. Herein, "the image 53 is added" means "the image 53 is disposed near" or "a portion or the whole of the image 53 is superimposedly disposed". In this example, since two icons 50 are contained in the folder 52, a numeral "2" is included in the image 53.

By the control illustrated in FIG. 6, the number of icons contained in the folder 52 can be comprehensibly displayed to the user. Although FIG. 6 represents an example of generating a folder in response to the approach of icons therebetween, the operation for generating a folder is not limited thereto.

Figure 7:
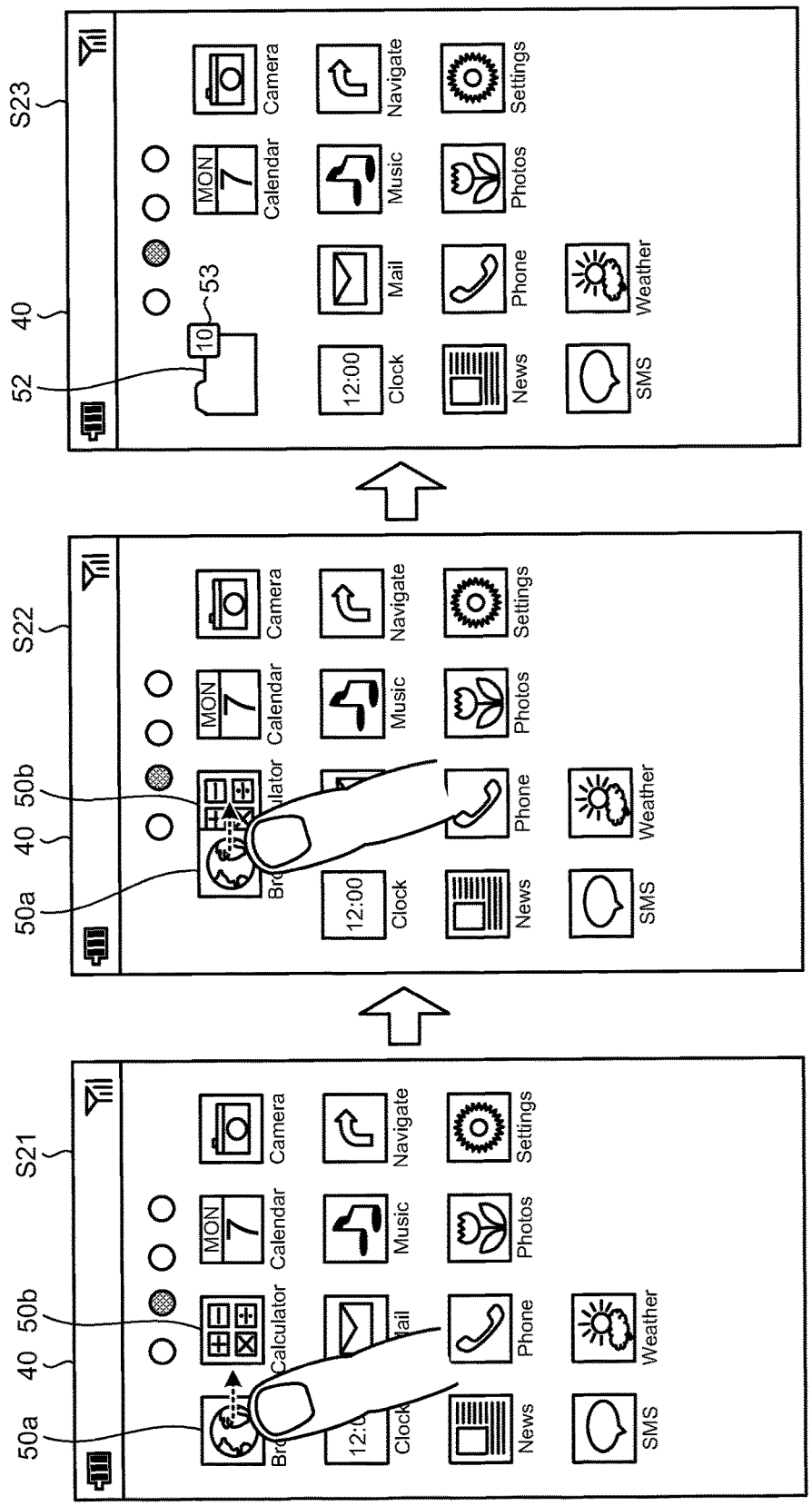
FIG. 7 is a diagram illustrating an example of control for displaying the number of icons containable in a folder.

Although FIG. 6 represents an example of displaying the number of icons 50 contained in the folder, the smartphone 1 may also display the number of icons containable in the folder, that is, the number of icons 50 that can be additionally contained in the folder, in association with the icons 50. FIG. 7 represents an example of control for generating a folder according to an operation of the user, containing icons in the generated folder, and displaying the number of icons containable in the folder. In the following, a case where the number of icons containable in the folder is 12 will be described as an example.

As illustrated in Step S21, for example, when an icon 50a is long-touched with a finger of the user, the smartphone 1 detects the same as a movement start operation for the icon 50a. Subsequently, as illustrated in Step S22, when the icon 50a is dragged by a finger of the user and is superimposed on an icon 50b, the smartphone 1 generates a folder 52 for containing the icon 50a and the icon 50b. Subsequently, as illustrated in Step S23, the smartphone 1 contains the icon 50a and the icon 50b in the generated folder 52 and disposes the folder 52, to which an image 53 corresponding to the number of icons containable in the folder 52 is added, on the home screen 40. In this example, since 10 icons 50 can be additionally contained in the folder 52, a numeral "10" is included in the image 53.

By the control illustrated in FIG. 7, the number of icons containable in the folder 52 disposed on the home screen 40 can be comprehensibly displayed to the user.

Figure 8:
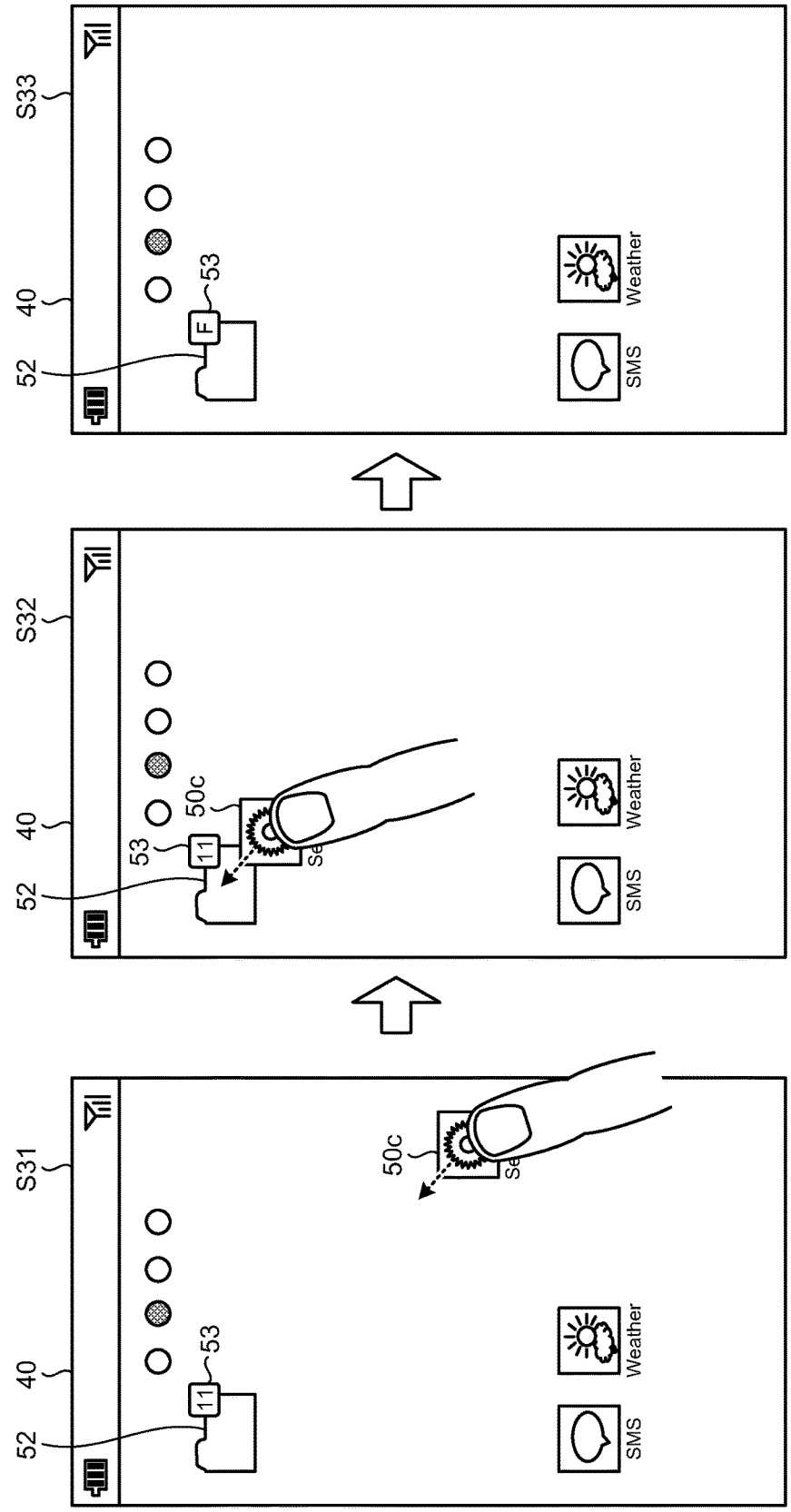
FIG. 8 is a diagram illustrating an example of control for displaying that the number of icons contained in a folder reaches an upper limit number containable.

FIG. 8 represents an example of control for displaying that the number of icons contained in a folder reaches an upper limit number containable.

At Step S31, 11 icons are contained in a folder 52. Accordingly, a numeral "11" is included in an image 53 added to the folder 52. As illustrated in Step S31, for example, when an icon 50c is long-touched with a finger of the user, the smartphone 1 detects the same as a movement start operation for the icon 50c.

Subsequently, as illustrated in Step S32, when the icon 50c is dragged by a finger of the user and is superimposed on the folder 52, the smartphone 1 contains the icon 50c in the folder 52.

Subsequently, as illustrated in Step S33, since the number of icons contained in the folder 52 reaches an upper limit number containable "12" as a result of containing the icon 50c in the folder 52, the smartphone 1 changes the image 53 added to the folder 52, to indicate that the number of contained icons reaches the upper limit number containable. In this example, the image 53 includes "F" indicating that the number of contained icons reaches the upper limit number containable.

By the control illustrated in FIG. 8, the fact that the number of icons contained in the folder 52 disposed on the home screen 40 reaches the upper limit number containable can be comprehensibly displayed to the user. A mode for displaying that the number of icons contained in the folder reaches the upper limit number containable is not limited to the example illustrated in FIG. 8. For example, the smartphone 1 may include another numeral, character, or symbol, which indicates that the number of contained icons reaches the upper limit number containable, in the image 53. Alternatively, when the number of contained icons reaches the upper limit number containable, the smartphone 1 may perform a display mode change, such as a color change or blinking, on the image 53.

Figure 9:
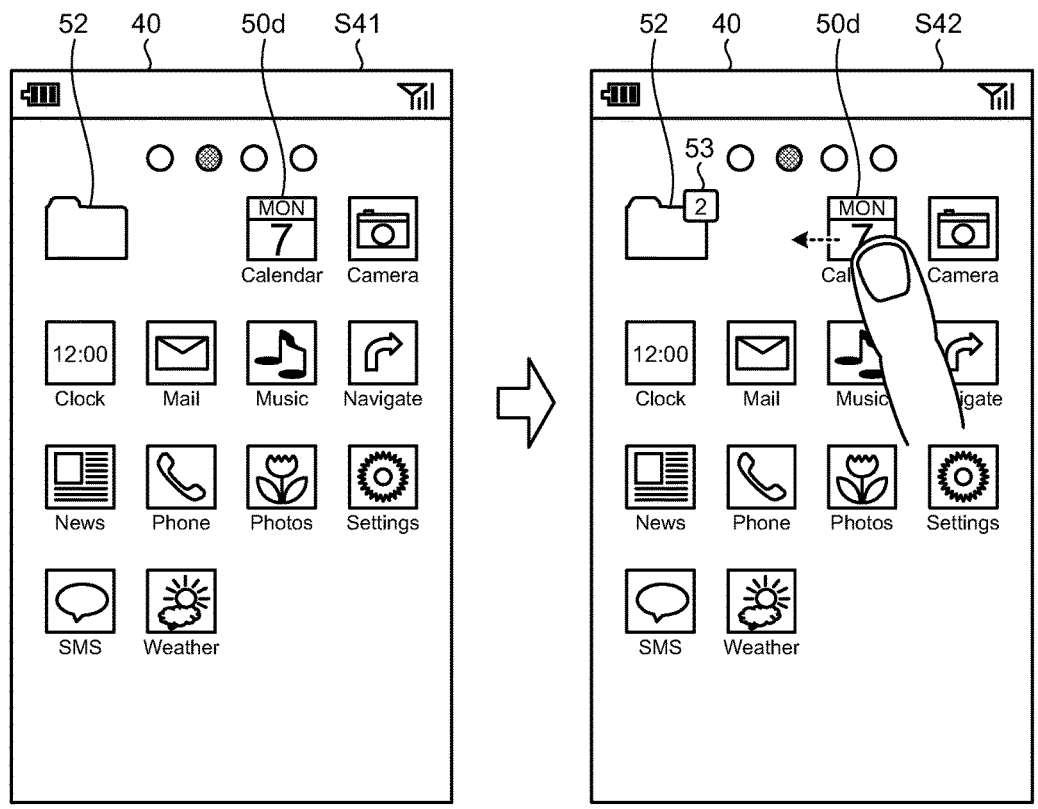
FIG. 9 is a diagram illustrating an example of control for displaying the number of icons contained in a folder, in response to the detection of an operation for moving an icon.

The display of the number of icons contained in the folder may not always be performed. For example, the smartphone 1 may display the number of icons contained in the folder, in response to the detection of an operation for moving an icon. FIG. 9 represents an example of control for displaying the number of icons contained in a folder, in response to the detection of a movement start operation for an icon.

At Step S41, for example, a plurality of icons including an icon 50d, and a folder 52 containing a plurality of icons are disposed on the home screen 40. It is assumed that two icons are currently contained in the folder 52. Subsequently, as illustrated in Step S42, for example, when an icon 50d is long-touched with a finger of the user, the smartphone 1 detects the same as a movement start operation for the icon 50d. In response to the detection of the movement start operation for the icon 50*d*, the smartphone 1 adds an image 53 indicating the number of icons contained in the folder 52, to the folder 52.

By the control illustrated in FIG. 9, since the number of icons contained in the folder 52 is displayed at the time of using the folder 52, the number of contained icons can be comprehensibly displayed to the user, while reducing the burden of always displaying the number of contained icons.

Figure 10:
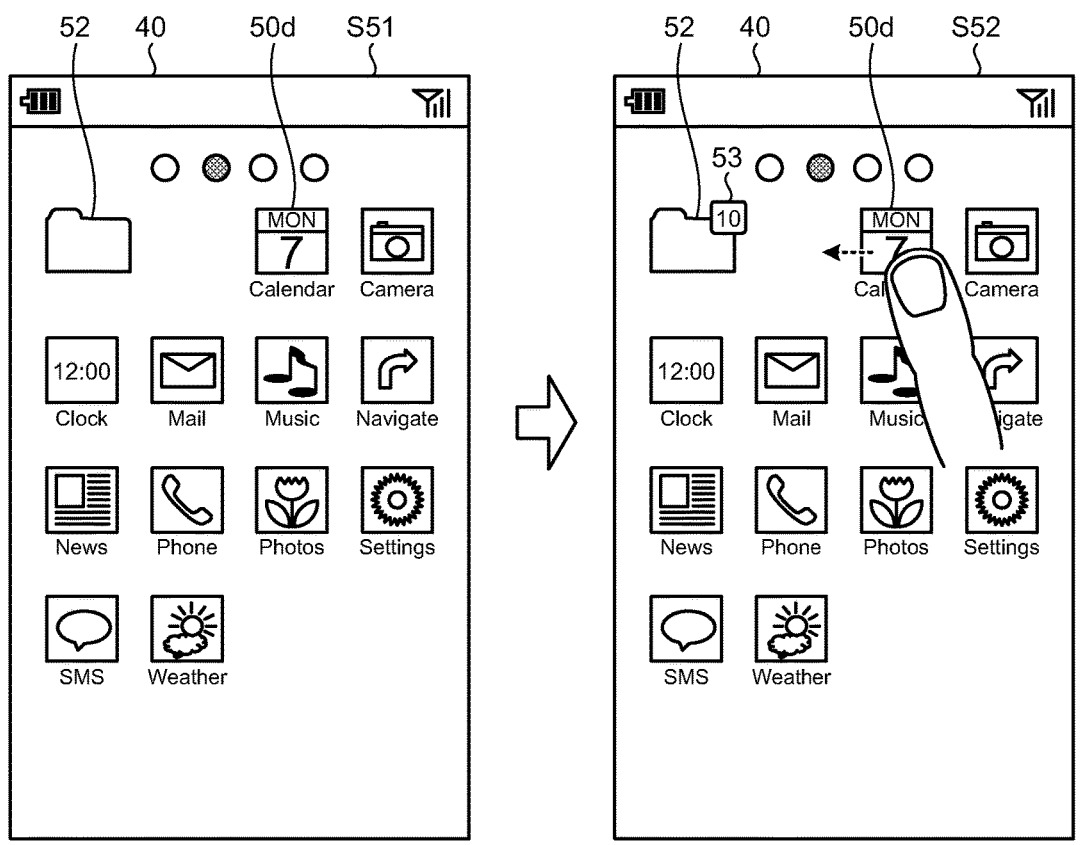
FIG. 10 is a diagram illustrating an example of control for displaying the number of icons containable in a folder, in response to the detection of an operation for moving an icon.

FIG. 10 represents an example of control for displaying the number of icons containable in a folder, in response to the detection of a movement start operation for an icon.

At Step S51, for example, a plurality of icons including an icon 50*d*, and a folder 52 containing a plurality of icons are disposed on the home screen 40. It is assumed that two icons are currently contained in the folder 52. Subsequently, as illustrated in Step S52, for example, when an icon 50*d* is long-touched with a finger of the user, the smartphone 1 detects the same as a movement start operation for the icon 50*d*. In response to the detection of the movement start operation for the icon 50*d*, the smartphone 1 adds an image 53 indicating the number of icons containable in the folder 52, to the folder 52.

By the control illustrated in FIG. 10, since the number of icons containable in the folder 52 is displayed at the time of using the folder 52, the number of contained icons can be comprehensibly displayed to the user, while reducing the burden of always displaying the number of contained icons.

Figure 11:
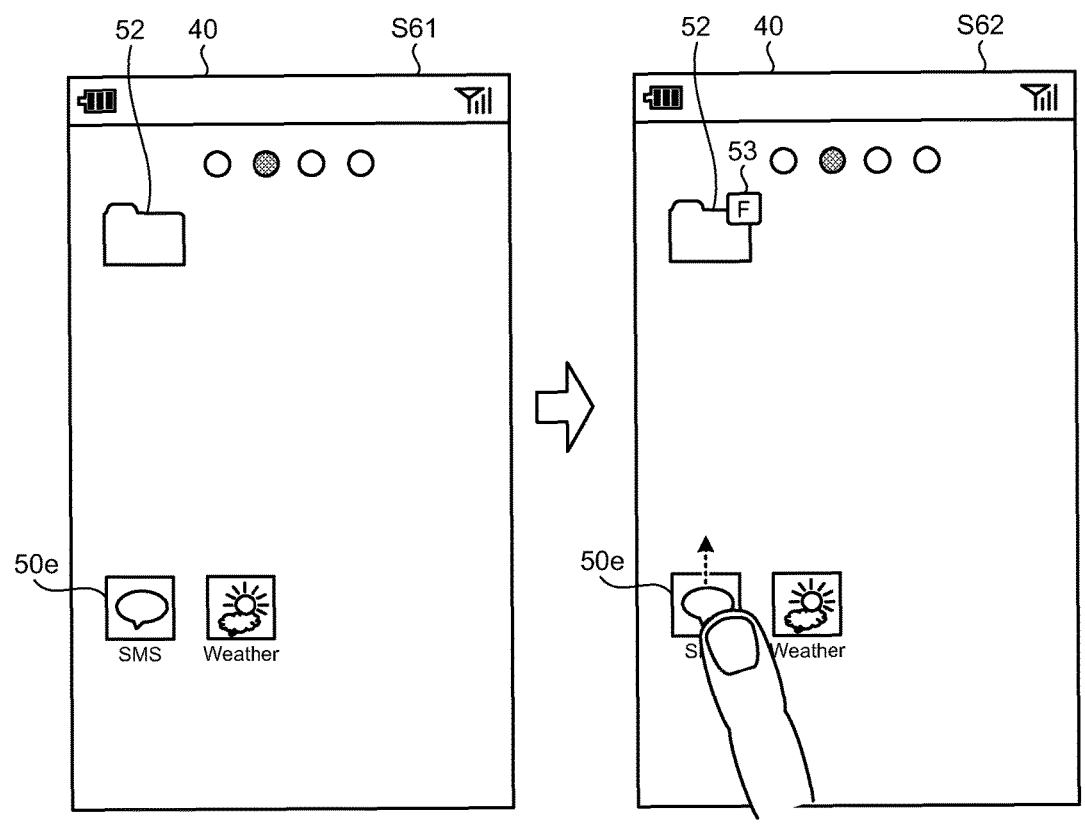
FIG. 11 is a diagram illustrating an example of control for displaying that the number of icons contained in the folder reaches an upper limit number containable, in a folder in response to the detection of an operation for moving an icon.

FIG. 11 represents an example of control for displaying that the number of icons contained in a folder reaches an upper limit number containable, in response to the detection of a movement start operation for an icon.

At Step S61, for example, a plurality of icons including an icon 50*e*, and a folder 52 containing a plurality of icons are disposed on the home screen 40. It is assumed that 12 icons are currently contained in the folder 52. Subsequently, as illustrated in Step S62, for example, when an icon 50*e* is long-touched with a finger of the user, the smartphone 1 detects the same as a movement start operation for the icon 50*e*. In response to the detection of the movement start operation for the icon 50*e*, the smartphone 1 adds an image 53 indicating that the number of contained icons reaches the upper limit number containable, to the folder 52.

By the control illustrated in FIG. 11, since that the number of icons contained in the folder 52 reaches the upper limit number containable is displayed at the time of using the folder 52, the fact that the number of contained icons reaches the upper limit number containable can be comprehensibly displayed to the user, while reducing the burden of always displaying that the number of contained icons reaches the upper limit number containable. Although FIGS. 9 to 11 illustrate the examples of adding the image indicating the containing status of the folder to the folder in response to the movement start operation for the icon, the condition for adding the image indicating the containing status of the folder to the folder is not limited thereto. For example, the smartphone 1 may add the image indicating the containing status of the folder to the folder in response to the detection of a drag operation of the icon 50.

Examples of a control processing procedure based on the function provided by the control program 9A will be described with reference to FIGS. 12 and 13. The processing procedure illustrated in FIG. 12 or the processing procedure illustrated in FIG. 13 is implemented by executing the control program 9A by the controller 10. The processing procedure illustrated in FIG. 12 or the processing procedure illustrated in FIG. 13 is repeatedly executed while the home screen 40 is being displayed. The processing procedure illustrated in FIG. 12 or the processing procedure illustrated in FIG. 13 is executed for each folder. Sometimes, the controller 10 executes another processing procedure for control related to the home screen 40, in parallel with the processing procedure illustrated in FIG. 12 and or processing procedure illustrated in FIG. 13.

First of all, a processing procedure of the controller 10 for displaying the number of icons contained in a folder will be described with reference to FIG. 12.

Figure 12:
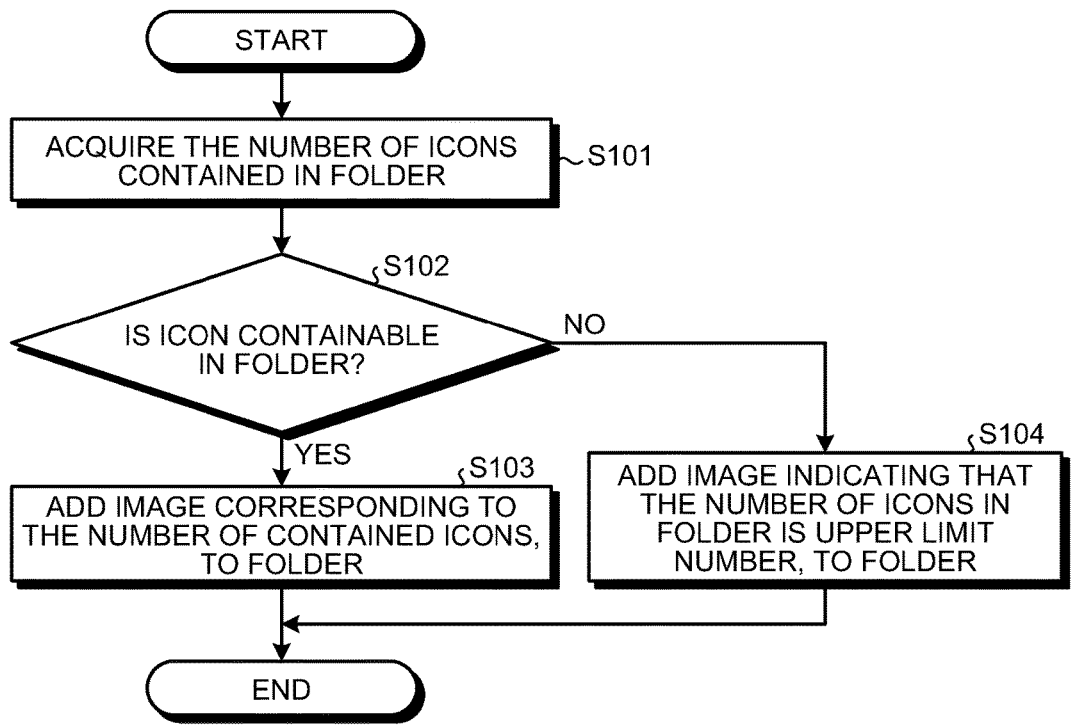
FIG. 12 is a diagram illustrating a processing procedure for displaying the number of icons contained in a folder, in response to the detection of an operation for moving an icon.
Figure 13:
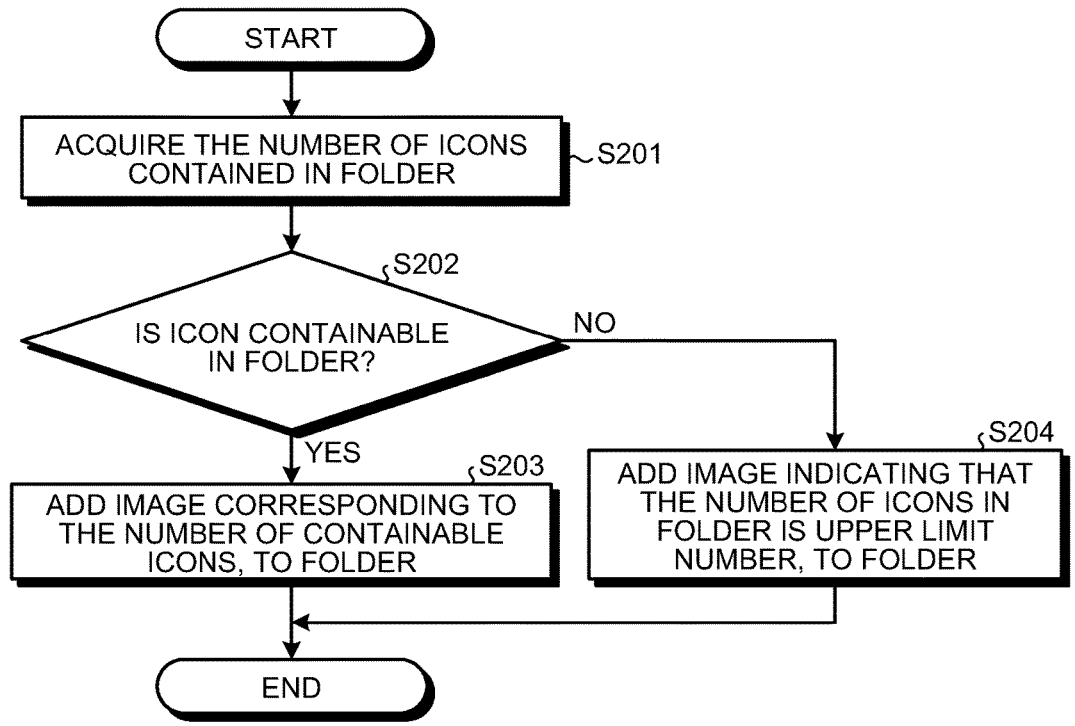
FIG. 13 is a diagram illustrating a processing procedure for displaying the number of icons containable in a folder, in response to the detection of an operation for moving an icon.

As illustrated in FIG. 12, at Step S101, the controller 10 acquires the number of icons contained in a folder. Subsequently, at Step S102, the controller 10 determines whether an icon is containable in the folder. For example, the controller 10 compares the number of icons contained in the folder with the number of icons containable in the folder, to determine whether an icon is containable in the folder.

When it is determined that an icon is containable in the folder at Step S102 (Yes at Step S102), then at Step S103, the controller 10 displays the folder to which an image corresponding to the number of icons contained in the folder is added. Thereafter, the controller 10 ends the processing.

On the other hand, when it is determined that an icon is not containable in the folder at Step S102 (No at Step S102), then at Step S104, the controller 10 displays the folder to which an image indicating that the number of icons contained in the folder is an upper limit number is added. Thereafter, the controller 10 ends the processing.

Next, a processing procedure of the controller 10 for displaying the number of icons containable in a folder will be described with reference to FIG. 13.

As illustrated in FIG. 13, at Step S201, the controller 10 acquires the number of icons contained in a folder. Subsequently, at Step S202, the controller 10 determines whether an icon is containable in the folder. For example, the controller 10 compares the number of icons contained in the folder with the number of icons containable in the folder, to determine whether an icon is containable in the folder.

When it is determined that an icon is containable in the folder at Step S202 (Yes at Step S202), then at Step S203, the controller 10 displays the folder to which an image corresponding to the number of icons containable in the folder is added. Thereafter, the controller 10 ends the processing.

On the other hand, when it is determined that an icon is not containable in the folder at Step S202 (No at Step S202), then at Step S204, the controller 10 displays the folder to which an image indicating that the number of icons contained in the folder is an upper limit number is added. Thereafter, the controller 10 ends the processing.

The processing procedures illustrated in FIGS. 12 and 13 may be started in response to the detection of a movement start operation for the icon or in response to a change in the number of icons contained in the folder.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

For example, as illustrated in FIG. 6, the case where the number of icons contained in the folder is displayed near the folder has been described in the above embodiment. However, the embodiment is not limited thereto, and the display mode of the folder itself may be changed, for example, by changing the color or shape of the folder according to the number of icons contained in the folder.

For example, as illustrated in FIG. 7, the case where the number of icons containable in the folder is displayed near the folder has been described in the above embodiment. However, the embodiment is not limited thereto, and the display mode of the folder itself may be changed, for example, by changing the color or shape of the folder according to the number of icons containable in the folder.

For example, as illustrated in FIG. 8, the case where the image indicating that the number of icons contained in the folder is the upper limit number containable is added to the folder has been described in the above embodiment. However, the embodiment is not limited thereto, and the display mode of the folder itself may be changed, for example, by changing the color or shape of the folder when the number of icons contained in the folder is the upper limit number containable.

In the embodiment, the smartphone has been explained as an example of the device provided with the touch screen; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device, comprising:
   a touch screen display configured to
      detect an operation, and
      display a folder and an icon outside the folder, the folder containing one or more icons, each of contained icons in the folder corresponding to an application; and
   a controller configured to cause the touch screen display to change a display mode of the folder
      (i) in response to detection of a start of an operation for moving the icon, and
      (ii) according to a number of the contained icons in the folder,
   wherein
      the controller is configured to cause the touch screen display to change the display mode of the folder by displaying a numerical character that indicates the number of icons additionally containable in the folder,
      before said detection of the start of the operation for moving the icon, the numerical character that indicates the number of icons additionally containable in the folder is not displayed by the touch screen display,
      in response to the detection of the start of the operation for moving the icon and according to the number of the contained icons in the folder, the controller is configured to cause the touch screen display to start displaying the numerical character that indicates the number of icons additionally containable in the folder,
      when the number of the contained icons in the folder has reached an upper limit number of icons containable in the folder,
         the controller is configured to cause the touch screen display to change a color of the folder, and
      when the number of the contained icons in the folder is smaller than the upper limit number of icons containable in the folder,
         the controller is configured to cause the touch screen display to change the display mode of the folder by displaying the numerical character indicating the number of icons additionally containable in the folder.

2. The device according to claim 1, wherein the controller is configured to cause the touch screen display to change the display mode of the folder by indicating the number of the contained icons in the folder.

3. The device according to claim 2, wherein
   when the number of the contained icons in the folder is the upper limit number of icons containable in the folder,
      the controller is configured to cause the touch screen display to change the display mode of the folder by indicating that the number of the contained icons in the folder is the upper limit number.

4. The device according to claim 3, wherein,
   when the number of the contained icons is smaller than the upper limit number of icons containable in the folder,
      the controller is configured to cause the touch screen display to change the display mode of the folder by indicating the number of the contained icons.

5. The device according to claim 1, wherein
   the controller is configured to cause the touch screen display to change the display mode of the folder by adding an image to the folder, the image corresponding to the number of the contained icons in the folder.

6. The device according to claim 1, wherein
   the controller is configured to cause the touch screen display to change the display mode of the folder by adding an image to the folder, the image corresponding to the number of icons additionally containable in the folder.

7. The device according to claim 1, wherein
   when the number of the contained icons in the folder has reached the upper limit number of icons containable in the folder,
      the controller is configured to cause the touch screen display to blink the folder.

8. The device according to claim 1, wherein
   the controller is configured to, when two icons are superimposed on each other, create a new folder containing the two icons.

9. The device according to claim 1, wherein
   the controller is configured to, in response to detection of an operation on one of the contained icons for executing the corresponding application, execute the corresponding application.

10. A method for controlling a device including a touch screen display, the method comprising:
    detecting an operation;
    displaying, on the touch screen display, a folder and an icon outside the folder, the folder containing one or more icons, each of contained icons in the folder corresponding to an application; and
    changing a display mode of the folder (i) in response to detection of a start of an operation for moving the icon, and
(ii) according to a number of the contained icons in the folder, wherein said changing comprises displaying a numerical character that indicates the number of icons additionally containable in the folder, before said detection of the start of the operation for moving the icon, the numerical character that indicates the number of icons additionally containable in the folder is not displayed by the touch screen display, in response to the detection of the start of the operation for moving the icon and according to the number of the contained icons in the folder, said changing comprises causing the touch screen display to start displaying the numerical character that indicates the number of icons additionally containable in the folder, when the number of the contained icons in the folder has reached an upper limit number of icons containable in the folder, the touch screen display changes a color of the folder, and when the number of the contained icons in the folder is smaller than the upper limit number of icons containable in the folder, the touch screen display changes the display mode of the folder by displaying the numerical character indicating the number of icons additionally containable in the folder.

11. A non-transitory storage medium that stores a program for causing, when executed by a device including a touch screen display, the device to execute:

detecting an operation;

displaying, on the touch screen display, a folder and an icon outside the folder, the folder containing one or more icons, each of contained icons in the folder corresponding to an application; and changing a display mode of the folder
(i) in response to detection of a start of an operation for moving the icon, and
(ii) according to a number of the contained icons in the folder, wherein said changing comprises displaying a numerical character that indicates the number of icons additionally containable in the folder, before said detection of the start of the operation for moving the icon, the numerical character that indicates the number of icons additionally containable in the folder is not displayed by the touch screen display, in response to the detection of the start of the operation for moving the icon and according to the number of the contained icons in the folder, said changing comprises causing the touch screen display to start displaying the numerical character that indicates the number of icons additionally containable in the folder, when the number of the contained icons in the folder has reached an upper limit number of icons containable in the folder, the touch screen display changes a color of the folder, and when the number of the contained icons in the folder is smaller than the upper limit number of icons containable in the folder, the touch screen display changes the display mode of the folder by displaying the numerical character indicating the number of icons additionally containable in the folder.

12. A device, comprising:

a touch screen display configured to
detect an operation, and
display a folder and an icon outside the folder, the folder containing one or more icons, each of contained icons in the folder corresponding to an application; and a controller configured to cause the touch screen display to change a display mode of the folder
(i) in response to detection of a start of an operation for moving the icon, and
(ii) according to a number of the contained icons in the folder, wherein the controller is configured to cause the touch screen display to change the display mode of the folder by displaying a numerical character that indicates the number of icons additionally containable in the folder, before said detection of the start of the operation for moving the icon, the numerical character that indicates the number of icons additionally containable in the folder is not displayed by the touch screen display, in response to the detection of the start of the operation for moving the icon and according to the number of the contained icons in the folder, the controller is configured to cause the touch screen display to start displaying the numerical character that indicates the number of icons additionally containable in the folder, when the number of the contained icons in the folder has reached an upper limit number of icons containable in the folder, the controller is configured to, in response to the detection of the start of the operation for moving the icon, cause the touch screen display to add an image to the folder, the image indicating that the number of the contained icons in the folder has reached the upper limit number, when the number of the contained icons in the folder is smaller than the upper limit number of icons containable in the folder, the controller is configured to, in response to the detection of the start of the operation for moving the icon, cause the touch screen display to display the numerical character indicating the number of icons additionally containable in the folder, and said image is not displayed by the touch screen display before said detection of the start of the operation for moving the icon.

13. The device according to claim 12, wherein said image contains no numerical character.

14. A method for controlling a device including a touch screen display, the method comprising:

detecting an operation;

displaying, on the touch screen display, a folder and an icon outside the folder, the folder containing one or more icons, each of contained icons in the folder corresponding to an application; and changing a display mode of the folder
(i) in response to detection of a start of an operation for moving the icon, and
(ii) according to a number of the contained icons in the folder, wherein
said changing comprises displaying a numerical character that indicates the number of icons additionally containable in the folder,
before said detection of the start of the operation for moving the icon, the numerical character that indicates the number of icons additionally containable in the folder is not displayed by the touch screen display,
in response to the detection of the start of the operation for moving the icon and according to the number of the contained icons in the folder, said changing comprises causing the touch screen display to start displaying the numerical character that indicates the number of icons additionally containable in the folder,
when the number of the contained icons in the folder has reached an upper limit number of icons containable in the folder,
in response to the detection of the start of the operation for moving the icon, the touch screen display adds an image to the folder, the image indicating that the number of the contained icons in the folder has reached the upper limit number,
when the number of the contained icons in the folder is smaller than the upper limit number of icons containable in the folder,
in response to the detection of the start of the operation for moving the icon, the touch screen display displays the numerical character indicating the number of icons additionally containable in the folder, and
said image is not displayed by the touch screen display before said detection of the start of the operation for moving the icon.

15. A non-transitory storage medium that stores a program for causing, when executed by a device including a touch screen display, the device to execute:
detecting an operation;
displaying, on the touch screen display, a folder and an icon outside the folder, the folder containing one or more icons, each of contained icons in the folder corresponding to an application; and
changing a display mode of the folder
(i) in response to detection of a start of an operation for moving the icon, and
(ii) according to a number of the contained icons in the folder,
wherein
said changing comprises displaying a numerical character that indicates the number of icons additionally containable in the folder,
before said detection of the start of the operation for moving the icon, the numerical character that indicates the number of icons additionally containable in the folder is not displayed by the touch screen display,
in response to the detection of the start of the operation for moving the icon and according to the number of the contained icons in the folder, said changing comprises causing the touch screen display to start displaying the numerical character that indicates the number of icons additionally containable in the folder,
when the number of the contained icons in the folder has reached an upper limit number of icons containable in the folder,
in response to the detection of the start of the operation for moving the icon, the touch screen display adds an image to the folder, the image indicating that the number of the contained icons in the folder has reached the upper limit number,
when the number of the contained icons in the folder is smaller than the upper limit number of icons containable in the folder,
in response to the detection of the start of the operation for moving the icon, the touch screen display displays the numerical character indicating the number of icons additionally containable in the folder, and
said image is not displayed by the touch screen display before said detection of the start of the operation for moving the icon.

* * * * *